(12) United States Patent
Drexler

(10) Patent No.: US 7,879,157 B2
(45) Date of Patent: Feb. 1, 2011

(54) METHOD FOR PRETREATING THE SURFACES OF WELD PARTS OF ALUMINUM OR ALLOYS THEREOF AND CORRESPONDING WELD PARTS

(75) Inventor: Frank Drexler, Ortenberg (DE)

(73) Assignee: Newfrey LLC, Newark, DE (US)

( * ) Notice: Subject to any disclaimer, the term of this patent is extended or adjusted under 35 U.S.C. 154(b) by 710 days.

(21) Appl. No.: 11/009,992

(22) Filed: Dec. 10, 2004

(65) Prior Publication Data

US 2005/0150575 A1 Jul. 14, 2005

(30) Foreign Application Priority Data

Dec. 12, 2003 (DE) ................ 103 58 590

(51) Int. Cl.
*B23K 1/20* (2006.01)
(52) U.S. Cl. ............... 148/247; 148/254; 148/275; 148/279; 228/206
(58) Field of Classification Search .......... 148/247, 148/254, 275, 279; 228/203–207
See application file for complete search history.

(56) References Cited

U.S. PATENT DOCUMENTS

| | | |
|---|---|---|
| 2,413,370 A | 12/1946 | Palmer |
| 2,491,479 A | 12/1949 | Dash |
| 2,670,424 A | 2/1954 | Martin |
| 2,858,414 A | 10/1958 | Dash |
| 3,481,634 A | 12/1969 | Rondeau |
| 4,136,073 A | 1/1979 | Muro et al. |
| 4,236,894 A | 12/1980 | Sommervold |
| 4,326,894 A | 4/1982 | Konnert |
| 4,633,054 A | 12/1986 | Patrick et al. |
| 4,684,304 A | 8/1987 | Franks |
| 5,391,238 A | 2/1995 | Reichgott |
| 5,391,240 A | 2/1995 | Seidel et al. |
| 5,449,414 A | 9/1995 | Dolan |
| 5,449,415 A | 9/1995 | Dolan |
| 5,584,946 A | 12/1996 | Karmaschek |

(Continued)

FOREIGN PATENT DOCUMENTS

DE 44 01 881 A1 7/1995

(Continued)

OTHER PUBLICATIONS

'ASM Handbooks: vol. 5 Surface Engineering', ASM International, 2002, p. 1-2.*

(Continued)

*Primary Examiner*—Roy King
*Assistant Examiner*—Janelle Morillo
(74) *Attorney, Agent, or Firm*—Harness, Dickey & Pierce, P.L.C.

(57) ABSTRACT

Described here is a method for pretreating the surfaces of weld parts of aluminum or alloys thereof, and weld parts produced with said method. Prior to welding, the weld parts are subjected to a treatment (17) in an acidic, aqueous solution, wherein the acidic, aqueous solution contains ions of the elements boron and/or silicon and/or titanium and/or zirconium and/or hafnium. The invention consists in that a polishing step (9) is carried out prior to the treatment in the acidic, aqueous solution to make for better sliding in a feed apparatus during the welding process.

17 Claims, 1 Drawing Sheet

U.S. PATENT DOCUMENTS

| | | | |
|---|---|---|---|
| 5,603,754 A | 2/1997 | Aoki et al. | |
| 5,618,491 A | 4/1997 | Kurup | |
| 5,685,680 A | 11/1997 | Duffy | |
| 5,728,233 A | 3/1998 | Ikeda | |
| 5,759,244 A | 6/1998 | Tomlinson | |
| 5,807,442 A | 9/1998 | Goodrcau | |
| 5,904,784 A | 5/1999 | Iino et al. | |
| 6,562,148 B1 * | 5/2003 | Wendel et al. | 148/247 |

FOREIGN PATENT DOCUMENTS

| | | |
|---|---|---|
| DE | 19856613 | 6/2000 |
| EP | 0291277 | 11/1988 |
| WO | WO 97/02369 | 1/1997 |
| WO | WO 98/52699 | 11/1998 |
| WO | WO 99/08806 | 2/1999 |
| WO | WO 00/34672 | 6/2000 |
| WO | WO02-31073 | 4/2002 |

OTHER PUBLICATIONS

English Abstract for DE 44 01 881 A1.

* cited by examiner

METHOD FOR PRETREATING THE SURFACES OF WELD PARTS OF ALUMINUM OR ALLOYS THEREOF AND CORRESPONDING WELD PARTS

BACKGROUND OF THE INVENTION

The invention concerns a method for pretreating the surfaces of weld parts of aluminum or alloys thereof that prior to welding are subjected to a treatment in an acidic, aqueous solution, wherein the acidic, aqueous solution contains ions of the elements boron and/or silicon and/or titanium and/or zirconium and/or hafnium.

The invention also concerns weld parts of aluminum or alloys thereof produced with this method.

SUMMARY OF THE INVENTION

A method of this nature and the weld parts produced according to the method are known from DE 198 56 613 A1. The treatment permanently prevents the formation of an oxide film that forms in just seconds on freshly scratched aluminum in air and in the presence of water. An oxide film of this nature provides corrosion protection, but has an adverse effect on the welding process. As a result of the specified treatment in the acidic solution, firstly the oxide film is removed and secondly the formation of a new oxide film is permanently prevented.

When weld parts thus treated are fed in an automatic device for welding, the problem arises that the treatment causes the weld parts to have a high coefficient of friction for sliding or rolling friction. This leads to difficulties in the automatic feeding of the weld parts to the welding location in the machine.

In order to solve this problem, attempts have already been made to provide the weld parts with a lubricant. However, the lubricant proved problematic in further processing of the weld parts and promoted their contamination.

The object of the invention is to produce a method for pretreating the surfaces of weld parts of aluminum or alloys thereof, and thus corresponding weld parts, wherein firstly the oxide films are removed and the formation of new oxide films on the weld parts is permanently prevented, and secondly the feeding of the weld parts in the feed apparatus is improved.

Surprisingly, the object is attained by the invention in that a polishing step is performed prior to the treatment in the acidic, aqueous solution. The reason this solution is surprising is that the surface of the weld parts is changed by the treatment in the acidic, aqueous solution to remove the oxide film. It was thus not to be expected that a polishing step occurring prior to the treatment in the acidic, aqueous solution would have a favorable effect on the sliding and rolling behavior of the weld parts.

The measures described in the dependent claims permit advantageous refinements and improvements to the method according to the invention and the weld parts according to the invention. Polishing of the weld parts by vibration in a water bath is especially economical. In order to remove the residue from cold forming, it is advantageous that at least one wash step and at least one rinse step be performed prior to the polishing step. The press oil is removed by centrifuging the weld parts. Health hazards are avoided in that the acidic, aqueous solution is chromium-free. The best results in polishing are achieved when the polishing step is performed for a maximum period of 1 hour. A further improvement of feed properties is achieved in that, after polishing and before the treatment in the acidic, aqueous solution, the weld parts are subjected to a heat treatment wherein the temperature is a maximum of 200° C.

The invention is explained in detail below on the basis of an example embodiment that is shown in FIG. 1.

DETAILED DESCRIPTION OF THE PREFERRED EMBODIMENTS

Figure 1:
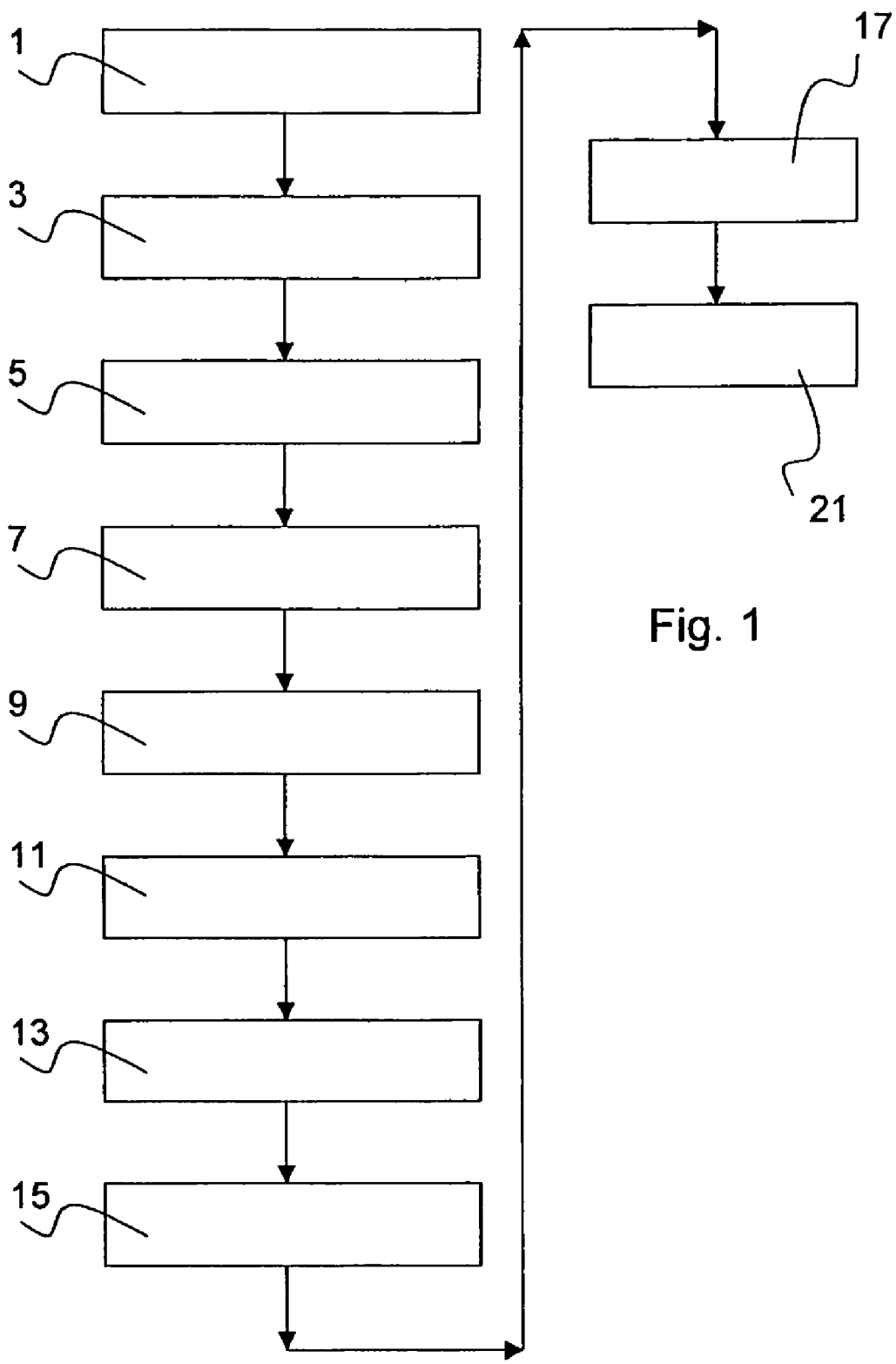
FIG. 1 shows a flow chart for a method according to the invention for producing weld parts according to the invention of aluminum or an aluminum alloy.

Weld parts, for example studs or pins, are used in many areas of industrial manufacturing and permit a hole-free, metallic connection between a base structure and a component to be fastened. Weld studs or pins can serve to fasten pipe conduits, pushbuttons, plastic nuts or cable clips. Such a weld stud has a head and a shank, where the welding face is formed on the welding head. After it is welded to the base structure, the shank is used for fastening the component.

The steps for manufacturing such weld parts are shown schematically in FIG. 1 by means of rectangles that are connected by arrows. Each step is labeled with a reference number. The connecting arrows indicate the order in which the individual steps are carried out.

The weld parts specified above are given the desired shape and length by cold forming from a wire in a step 1. In a step 3 following that, the press oil is removed from the weld parts by centrifuging. A subsequent step 5 comprises washing of the weld parts with an acid or a base. In a following step 7, the washed weld parts are rinsed.

For the subsequent polishing step 9, the weld parts are placed in a drum and covered with water. Once the drum has been set in rotation, the weld parts tumble against one another, whereby a polishing effect is achieved. Polishing is performed for a period of a maximum of one hour, preferably a maximum of 30 minutes.

After polishing of the weld parts through rotation of the drum, the weld parts are rinsed with water in a step 11 and then removed from the drum, and in a step 13 dried in a centrifuge. This step is followed in a preferred example embodiment by a heat treatment 15 carried out at a maximum temperature of 200° C., preferably a maximum 150° C., prior to the treatment in the aqueous, acidic solution.

After completion of the heat treatment, in a step 17 the known treatment with the aqueous, acidic solution is performed before the weld parts are then dried in a subsequent step 21. The solution known as Alodine 2040 from Henkel Surface Technologies is used by preference as the aqueous, acidic solution. This is a chromium-free solution.

In another example embodiment, it is also possible for the polishing step 9 to be performed in a vibratory bath, where the weld parts must be completely covered by water in this case as well. The vibratory bath consists of a rectangular container that is set in motion ("vibration") by an appropriate, known mechanism so that the weld parts tumble against one another.

What is claimed is:

1. A method for pretreating a surface of weld studs or weld pins of aluminum alloys for subsequent automatic feeding and welding, comprising the steps of:
    a) polishing the weld studs or weld pins by tumbling them against one another while covered with water; and then b) subjecting the polished studs or pins to a treatment in an acidic, aqueous solution containing ions of at least one of the elements of boron, silicon, titanium, zirconium and hafnium, thereby improving the automatic feeding of said weld studs or weld pins.

2. The method of claim 1, wherein polishing is carried out by vibrating the weld studs or pins in a vibratory bath.

3. The method of claim 1, wherein the weld studs or weld pins are manufactured from wire material by cold forming.

4. The method of claim 3, wherein at least one wash step and at least one rinse step is performed prior to the polishing step in preparation for the surface treatment.

5. The method of claim 4, wherein the weld studs or weld pins are centrifuged to clean them after cold forming.

6. The method of claim 1, wherein the acidic, aqueous solution is chromium-free.

7. The method of claim 1, wherein the polishing step is carried out for a maximum period of about 1 hour.

8. The method of claim 1, wherein a heat treatment is performed after the polishing step and prior to the treatment with the acidic, aqueous solution.

9. The method claim 8, wherein the heat treatment is carried out at a maximum temperature of about 200° C.

10. The method of claim 1, wherein the acidic, aqueous solution comprises ions of titanium.

11. The method of claim 1, wherein tumbling comprises rotating the studs or pins in a drum.

12. A process of producing a hole-free metallic connection between a base structure and a component to be fastened, the method comprising:

feeding treated weld studs made of an aluminum alloy in an automatic device to the surface of the base structure, wherein the studs comprise a weld head attached to a shank;

welding the head of the weld stud to the base structure; and fastening the component to the shank of the weld stud, wherein the treated studs are treated by a process comprising polishing the weld studs by tumbling them against one another; and treating the polished studs in an acidic aqueous solution, thereby improving the automatic feeding of said weld studs.

13. A method for pretreating a surface of weld studs or pins of aluminum alloys for subsequent automatic feeding and welding, comprising the steps of:

a) polishing the weld studs or pins by tumbling them against one another; and then b) subjecting the polished parts to a treatment in an acidic, aqueous solution containing ions of at least one of the elements of boron, silicon, titanium, zirconium and hafnium, thereby improving the automatic feeding of said weld studs or pins.

14. The method of claim 13, wherein tumbling comprises rotating the studs or pins in a drum.

15. The method of claim 13, wherein the acidic, aqueous solution comprises ions of titanium.

16. A process of producing a hole-free metallic connection between a base structure and a component to be fastened, the method comprising preparing treated weld studs or pins according to the method of claim 13, wherein the studs comprise a weld head attached to a shank;

feeding the treated studs in an automatic device to the surface of the base structure;

welding the head of the weld stud to the base structure; and fastening the component to the shank of the weld stud.

17. A process according to claim 16, wherein the component is selected from the group consisting of pipe conduits, push buttons, plastic nuts, and cable clips.

* * * * *